Figure 3:
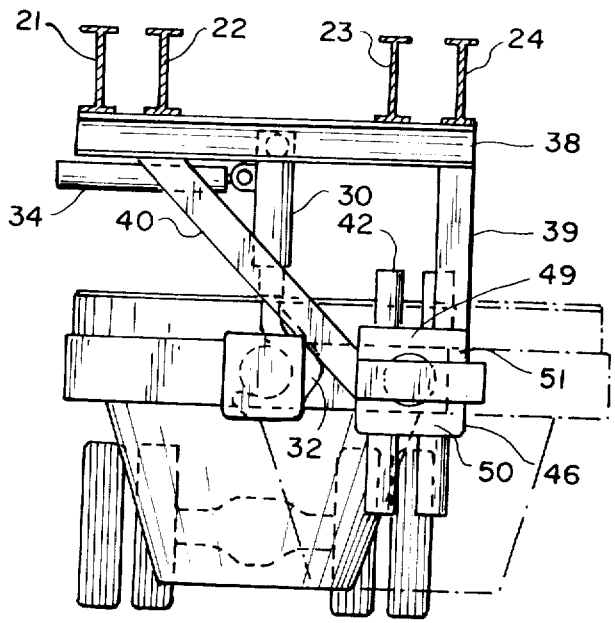

United States Patent

Brock

[11] 3,897,881

[45] Aug. 5, 1975

[54] SIDE-DUMPING SLAG POT CARRIER

[76] Inventor: Gibson E. Brock, R.D. 5, Persimmon Rd., Sewickley, Pa. 15143

[22] Filed: May 1, 1974

[21] Appl. No.: 465,864

[52] U.S. Cl. .............................. 214/317; 294/73
[51] Int. Cl. ........................................... B65g 65/04
[58] Field of Search............ 294/67 BA, 67 DC, 73; 214/312, 313, 314, 300, 315, 316, 317

[56] References Cited
UNITED STATES PATENTS

| 484,437 | 10/1892 | Kennedy | 214/313 |
|---|---|---|---|
| 1,520,047 | 12/1924 | Alden et al. | 214/313 |
| 1,855,862 | 4/1932 | McCann et al. | 214/313 |
| 2,888,157 | 5/1959 | Riley | 214/313 |
| 3,226,783 | 1/1966 | Draxler | 214/707 |

Primary Examiner—Frank E. Werner
Assistant Examiner—Lawrence J. Oresky
Attorney, Agent, or Firm—Buell, Blenko & Ziesenheim

[57] ABSTRACT

A rubber-tired in-plant slag pot and scrap box carrier utilizes a powered tractor unit, a powered single-axle trailing end unit, and a load-carrying bridge connecting the tractor and trailing end units and supported by them at each end. The bridge is provided with a pair of trolleys movable crosswise thereof, each carrying a hook, and together adapted to pick up a slag pot by its trunnions and carry it beneath the bridge. Affixed to the bridge is coupling apparatus adapted to make connection with a trunnion when the trolleys are moved to one side of the bridge and to tip the slag pot about its trunnion, so dumping out the slag broadside of the carrier.

7 Claims, 6 Drawing Figures

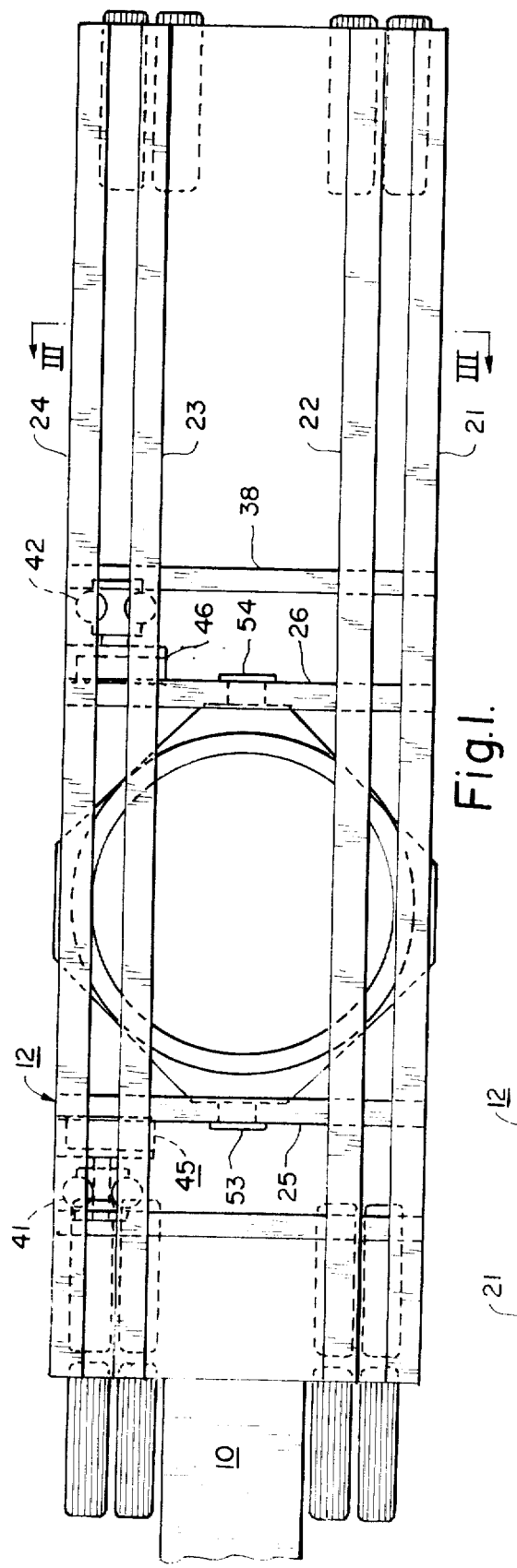
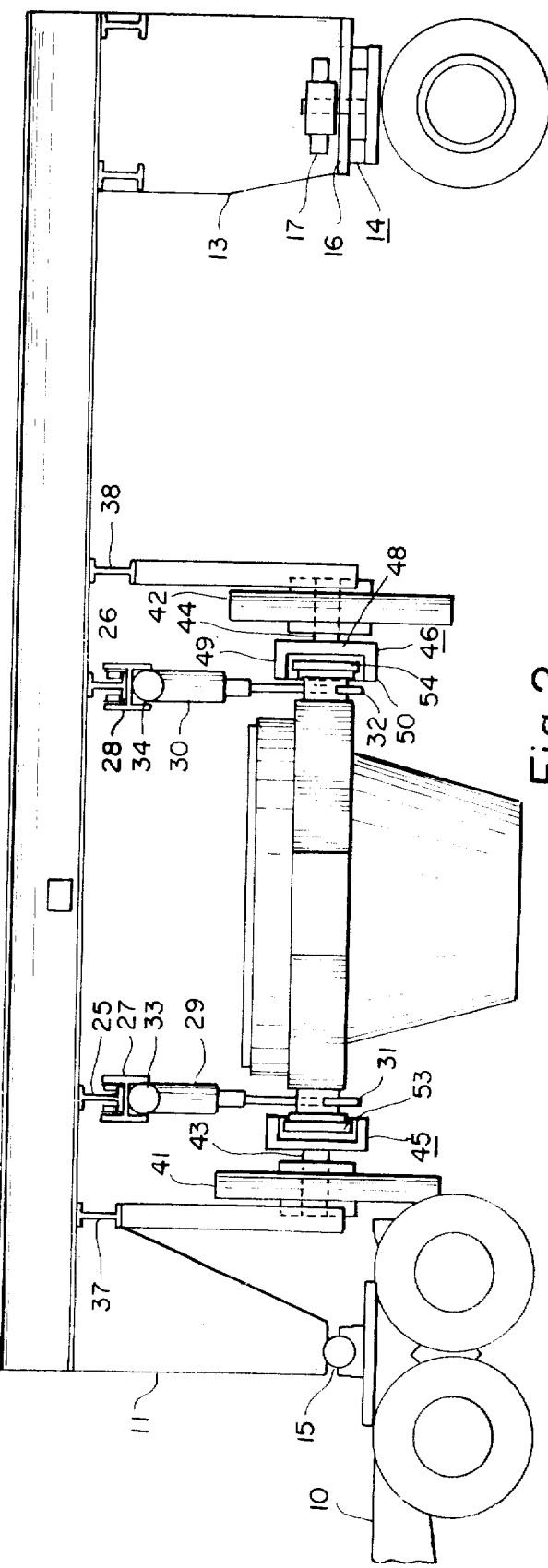

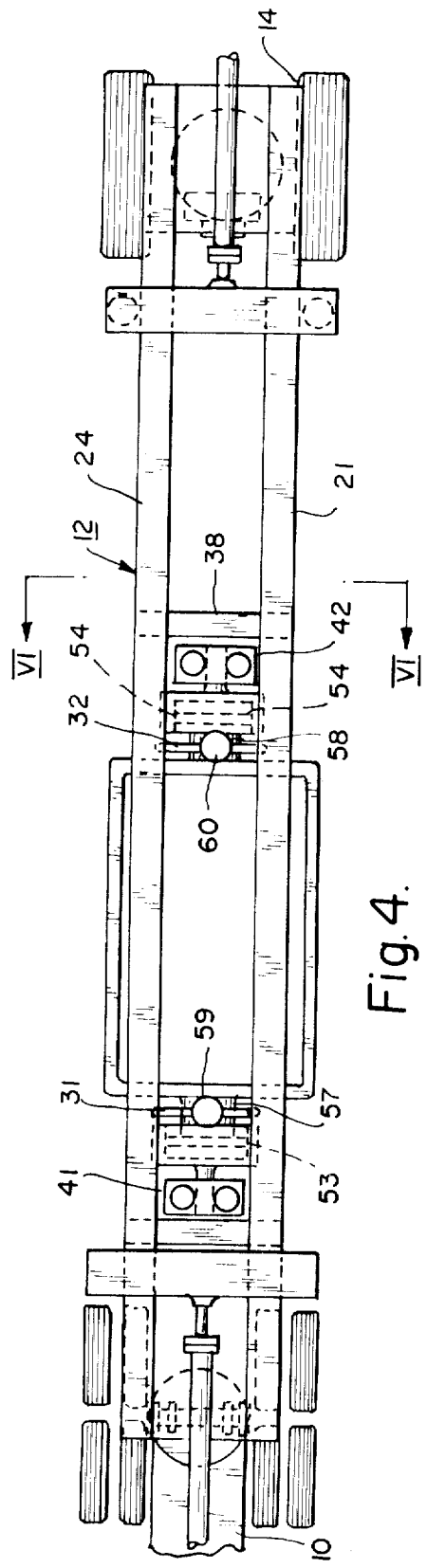
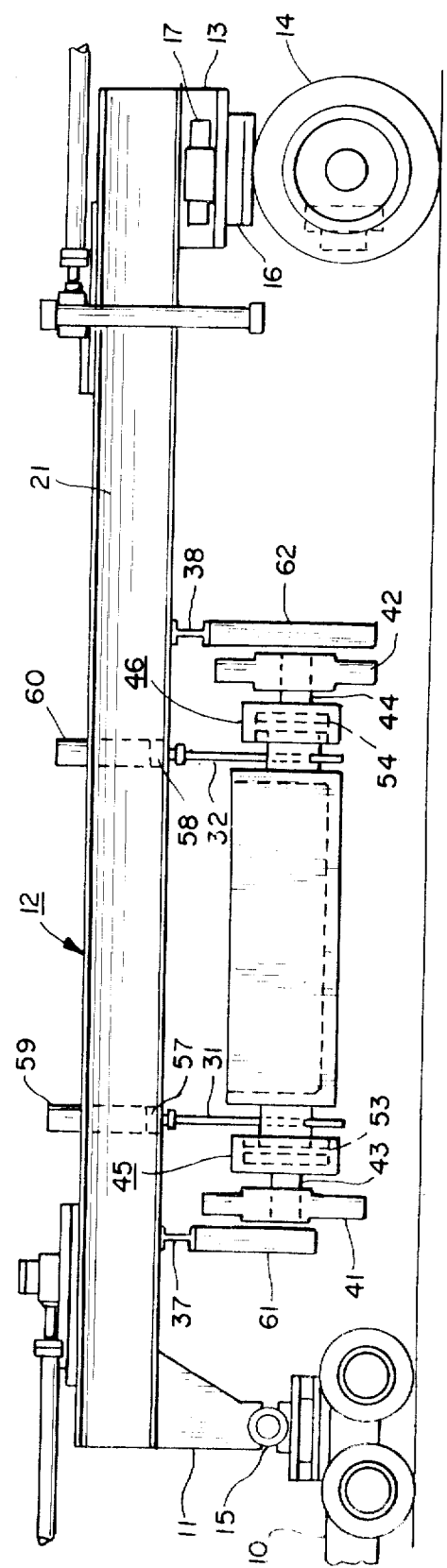
Fig. 4.
Fig. 5.

SIDE-DUMPING SLAG POT CARRIER

This invention relates to self-loading over-the-road carriers adapted for in-plant use. It is more particularly concerned with mechanisms adapting such carriers for side-dumping of slag pots, scrap boxes and the like.

In steel plants, and perhaps to a somewhat lesser extent in other metallurgical plants, the disposal of the slag produced in the refining operation poses substantial problems. This slag is, of course, tapped out of the steel-making furnace in a molten condition and must be disposed of before it solidifies more than superficially. Basic oxygen steel-making furnaces, which produce the bulk of the steel made today, operate on a tap-to-tap cycle of 30 to 45 minutes, which means that the slag from each blow as it is tapped must be handled promptly.

Steel-making shops without exception are laid out for railroad handling, both of the materials to be charged into the furnaces and steel and slag tapped therefrom. Furnaces are arranged in-line between a charging aisle and one or more pouring or dumping aisles, each of which is provided with railroad tracks running lengthwise thereof and entering and leaving through the ends of the shop building. Each aisle is serviced with overhead cranes which run lengthwise of the aisles on elevated rails. Each crane bridge has a trolley which runs crosswise of the aisle.

Steel is tapped from a basic oxygen furnace into a ladle positioned on a transfer car on the teeming aisle side by tilting the furnace on its trunnions in that direction. That ladle, which is disposed with its trunnions aligned parallel to the furnace trunnions, is brought out on the transfer car on tracks extending crosswise of the teeming aisle, picked up by a ladle crane, and carried over the ingot molds, which are positioned in-line on cars standing on a railroad track in the teeming aisle. The crane moves the ladle from one mold to the next along the track as the molds are filled. Slag is dumped from a furnace by inverting it on its trunnions over a slag pot or thimble positioned beneath it on the charging aisle side on a transfer car, also with the slag pot trunnions aligned parallel to the furnace trunnions. The slag pot is brought out by the transfer car on tracks extending crosswise of the charging aisle, picked up by the same type of crane that handles the steel ladle, and either deposited on a railroad car waiting on a railroad track or dumped in an area under the craneway.

Handling slag in the conventional way above described requires repeated coordination, at short intervals, of the crane operation and railroad operation and involves considerable manpower. Because of this, proposals have been made to dispense with the use of the railroad, and to handle the slag pot from the transfer car by crane to a convenient point on the floor, from which rubber-tired vehicles which travel over roadways can retrieve the pot and carry it to a more remote location for dumping. Several such vehicles have been patented, as for example, in U.S. Pat. No. 3,330,492 issued July 11, 1967 to E. S. Kress, U.S. Pat. No. 3,446,378 issued May 27, 1949 to R. A. Miller, and U.S. Pat. No. 3,722,720 issued Mar. 27, 1973 to S. J. Sjostrom et al. Each of those vehicles is rear-loading and rear-dumping. Their construction requires them to be backed up to the slag pot, which means that the vehicle must enter the charging aisle, proceed along it, and then position itself crosswise of the aisle so as to back up to the slag pot. As charging aisles are usually laid out primarily to accommodate railroad tracks, the roadway space is limited, and maneuvering of rear-loading slag pot carriers is frequently tedious. Furthermore, in rear-loading and dumping slag pot carriers, a desirable load distribution between front and rear axles of the vehicle is difficult to reconcile with the requirment that the hot slag during dumping be kept at a distance from the vehicle tires.

The problems of handling scrap in a steel plant are somewhat similar to those of handling slag, as concerns the utilization of railroad and crane facilities. Scrap is generally collected and transported in scrap boxes which are large rectangular open-top structures adapted to be picked up by a crane and transported by railroad car. Rear-loading rubber-tired vehicles have the same disadvantages in picking up and transporting scrap boxes as they do in picking up and transporting slag pots.

It is an object of my invention, therefore, to provide an in-plant over-the-road slag pot and scrap box carrier that is side-loading and side-dumping and need not be maneuvered crosswise of a shop aisle to pick up its load. It is another object to provide such a carrier that is entirely automatic in its operation. It is another object to provide such a carrier that picks up and carries the loaded slag pot on the center line of the vehicle, but dumps it from a position at one side of the vehicle. Other objects of my invention will appear in the course of the description thereof which follows.

My invention utilizes transport apparatus comprising a powered tractor unit, a powered trailing end unit, and a load-carrying bridge connecting the tractor and trailing end units and supported by them at each end. A suitable vehicle of this type is disclosed in my U.S. Pat. No. 3,721,358 issued Mar. 20, 1973, which disclosure is incorporated herein and made a part hereof. Instead of the longitudinally movable trolleys and load-carrying slings of that patent, my invention as respects slag pots is provided with a pair of trolleys movable crosswise of the bridge, each carrying a hook, and together adapted to pick up a slag pot by its trunnions and carry it beneath the bridge. Affixed to the bridge is coupling apparatus adapted to make connection with the slag pot when the trolleys are moved to one side of the bridge and to tip the slag pot about its trunnions, so dumping out the slag broadside of the carrier. Preferably, my coupling apparatus makes connection with a trunnion end beyond its supporting hook, and rotates it so as to tip the slag pot. With scrap boxes, which for use with my apparatus are provided with a trunnion at each end, no trolleys are necessary and the hook mechanisms and the coupling apparatus are both affixed to the bridge.

Figure 6:
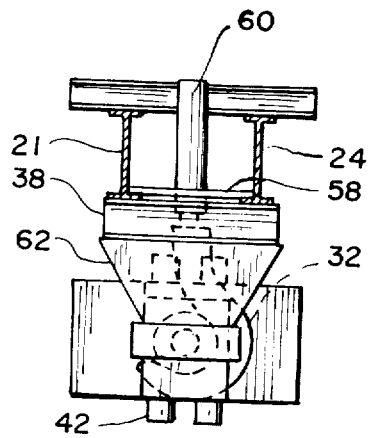

Embodiments of my invention presently preferred by me are illustrated in the attached drawings, to which reference is now made:

FIG. 1 is a plan of a first embodiment of the apparatus of my invention in its traveling position, FIG. 2 is a side elevation of the apparatus of FIG. 1, FIG. 3 is a cross section of the apparatus of FIG. 1 on the plane III—III, thereof FIG. 4 is a plan of a second embodiment of my invention in its traveling position, FIG. 5 is a side elevation of the apparatus of FIG. 4, and FIG. 6 is a cross section of a portion of the apparatus of FIG. 4 on the plane VI—VI, thereof.

My apparatus in its first embodiment is carried by a vehicle comprising, broadly, an elongated load-carrying bridge 12, supported at its front end by an upright member 11 mounted on a tractor unit 10, and at its rear end by an upright member 13 mounted on a single-axle trailing-end unit 14. Tractor 10 and trailing-end unit 14 are both powered, and the vehicle is fully described in my U.S. Pat. No. 3,721,358 previously mentioned. Upright member 11 is connected to tractor 10 through a pivot mechanism 15 which permits movement of bridge 12 relative to tractor 10 both in the vertical and horizontal planes, which mechanism is described in my patent. Upright member 13 is connected to trailing end unit 14 through a pivot mechanism 16 which is also described in my patent. Means 17 are also provided in trailing-end unit 14 for rotating that unit relative to bridge 12 about the vertical center line of pivot mechanism 16, which passes through the axle of the wheels. Suitable means for this purpose are also described in my patent.

Bridge 12 is constructed of parallel I-beams 21 and 22 spaced apart from each other and positioned at one side thereof, and like parallel I-beams 23 and 24 spaced apart and positioned at the other side thereof, resting at their front ends on upright member 11 and at their rear ends on upright member 13. The number of I-beams and their weights are, of course, dependent on the weight of the load to be carried. Intermediate their ends and attached to the lower flanges of bridge I-beams 21, 22, 23 and 24 are cross I-beam 25, near upright member 11, and cross I-beam 26, near upright member 13. Those I-beams are spaced from each other a distance slightly less than the end-to-end dimension of the trunnions of a slag pot, and their lower flanges serve as rails for trolleys 27 and 28, respectively. Those trolleys carry depending hydraulic cylinders 29 and 30 respectively, to which are attached hooks 31 and 32 respectively. Those hooks are dimensioned to hold the trunnions of a slag pot. A horizontally disposed hydraulic cylinder 33 is affixed to the lower flange of I-beam 25 at its end below bridge I-beams 21 and 22, with its piston rod attached to trolley 27, and a like cylinder 34 is affixed to the lower flange of I-beam 26 with its piston rod attached to trolley 28.

Intermediate cross I-beam 25 and upright member 11 a cross I-beam 37 is affixed to the lower flanges of bridge I-beams 21, 22, 23 and 24, and intermediate cross I-beam 26 and rear upright member 13 is likewise affixed a cross I-beam 38. From the end of cross I-beam 38 below bridge I-beam 24 depends a vertical member 39 which, with a brace 40 which extends diagonally downwardly from the other end of I-beam 38, supports a hydraulic rotary torque actuator 42 disposed with its shaft 44 positioned parallel to the bridge I-beams. A like torque actuator 41 is similarly supported below I-beam 37. The torque actuators may be of the type shown in U.S. Pat. No. 3,338,140 issued to J. Sheesley on Aug. 29, 1967, or other suitable types. Such actuators, which are commonly used to operate plug valves and the like, utilize one or more pairs of opposed hydraulic cylinders the piston rods of which are connected by a toothed rack. Movement of the rack rotates a pinion attached to a shaft to be turned.

Shaft 43 of rotary torque actuator 41 is fitted at its rearward-facing end with a coupling 45 and shaft 44 of rotary torque actuator 42 is fitted at its forward-facing end with a like coupling 46. Each coupling is merely an approximately square piece of a channel having an upright web 48 affixed to its respective shaft, midway between oppositely facing flanges 49 and 50. One end of the channel is provided with a closed end 51; the other end is open. To the outer end of one trunnion of a slag pot is affixed a square plate 53 with a pair of opposite sides disposed horizontally when the slag pot is upright. The plate is dimensioned so that those sides fit between opposite flanges 49 and 50 of coupling 45 or 46. A like plate 54 is affixed to the outer end of the other trunnion of the slag pot. Rotary torque actuators 41 and 42 are positioned vertically so that plates 53 and 54 fit into couplings 45 and 46 when the slag pot is raised above ground into its traveling position.

The operation of my apparatus as concerns the maneuvering of the carrier vehicle over a load is described in my patent. It proceeds with trolleys 27 and 28 of my apparatus here described moved to their extreme positions adjacent torque actuators 41 and 42 respectively. This movement is effected by admitting hydraulic fluid to the outer ends of cylinders 33 and 34. Those cylinders, as well as all the other hydraulic apparatuses described herein, are connected to a source of hydraulic fluid under pressure, not shown, carried by tractor 10, through pipe lines and appropriate valves, also not shown. Hooks 31 and 32 are thus moved to one side of the vehicle. The carrier vehicle is maneuvered so that the slag pot is centered under bridge 12 between bridge I-beams 21 and 24, and between the vertical planes of hooks 31 and 32.

Those hooks are raised or lowered to a position in which they are capable of engaging the slag pot trunnions, by admitting hydraulic fluid to the proper end of hydraulic cylinders 29 and 30. Those hooks are then moved laterally so that they enclose the slag pot trunnions by admitting hydraulic fluid to the inner ends of hydraulic cylinders 33 and 34. Hooks 31 and 32 fit around the trunnions at each side of a slag pot between the trunnions ring and plate 53 or 54, respectively. Hydraulic fluid is admitted to the lower ends of hydraulic cylinders 29 and 30, raising the hooks and lifting the slag pot from the ground. In that position the vehicle travels, carrying the pot from the steel-making shop to the slag dump.

The carrier vehicle is driven up to the dump and maneuvered so that the side of bridge 12 along which torque actuators 41 and 42 are mounted adjoins the dumping site. The slag pot is raised or lowered by admitting hydraulic fluid to the appropriate end of cylinders 29 and 30 to bring plates 53 and 54 into line with the open ends of channel couplings 45 and 46. Hydraulic fluid is admitting to the outside ends of cylinders 33 and 34, moving trolleys 27 and 28 and the suspended slag pot carrying plates 53 and 54 towards couplings 45 and 46 until the plates slide into those couplings and come to rest against the closed ends 51 thereof. In this way the slag pot is moved from its position on the center line of the carrier, as shown in solid lines in FIG. 3, to a position at the dump site side of the carrier as shown in broken lines in that FIG. The slag is dumped by admitting hydraulic fluid to torque actuators 41 and 42 so as to cause couplings 45 and 46 to rotate clockwise, as seen from FIG. 3. The weight of the pot and its contents is carried by hooks 31 and 32, in which the cylindrical trunnions turn during the dumping operation. The slag pot is rapped against the ground or a barrier at the dump by causing torque actuators 41 and 42 to rotate a few degrees in one direction and then in the other.

The second embodiment of my invention is particularly adapted for scrap box handling. Scrap is dumped out on the ground or floor for subsequent handling rather than into a pit, and because of the maneuverability of my vehicle does not need to be dumped clear of its path. Therefore, this embodiment of my invention requires no trolleys.

As in my first embodiment previously described herein, the apparatus of my second embodiment is carried by a vehicle like that described in my U.S. Pat. No. 3,721,358, comprising broadly a load-carrying bridge 12 supported at its front end by an upright member 11 mounted on a tractor unit 10, and at its rear end by an upright member 13 mounted on a single-axle powered trailing-end unit 14. Upright member 11 is connected to tractor 10 through a pivot mechanism 15 as before. Upright member 13 is connected to trailing end unit 14 likewise through a pivot mechanism 16 as before. Means 17 are provided in trailing-end unit for rotating that unit relative to bridge 12 about the vertical center line of pivot mechanism 16 which passes through the axle of the wheels.

Bridge 12 in this embodiment is constructed of two parallel I-beams 21 and 24 spaced apart from each other resting at their front ends on upright member 11 and at their rear ends on upright member 13. Intermediate the ends of those I-beams and attached thereto are cross members 57 and 58, spaced apart a distance approximately the length of a scrap box. Centrally positioned on cross member 57 is an upright hydraulic cylinder 59, and on cross member 58 a hydraulic cylinder 60. Attached to the piston rod of cylinder 59, which extends from the bottom thereof, is a hook 31, and attached to the like piston rod of cylinder 60 is a like hook 32. Those hooks are dimensioned to accept the trunnions of a scrap box.

Intermediate cross member 57 and upright member 11 a cross I-beam 37 is affixed to the lower flanges of I-beams 21 and 24, and intermediate cross member 58 and upright member 13 is likewise affixed across I-beam 38. A vertical member 61 depends from I-beam 37 and a like vertical member 62 from I-beam 38. Centrally attached to the inner face of member 61 is a hydraulic rotary torque actuator 41, and centrally attached to the inner face of member 62 is a like rotary torque actuator 42. Shaft 43 of rotary torque actuator 41 and shaft 44 of rotary torque actuator 42 face each other. The rearward-facing end of shaft 43 is fitted with a coupling 45, which has been described herein, and the forward-facing end of shaft 44 is fitted with a like coupling 46. The ends of the trunnions of a scrap box are fitted with square plates 53 and 54, which have also been described herein. The spacing between couplings 44 and 45 is adjusted so that they can simultaneously receive plates 53 and 54. Rotary torque actuators 41 and 42 are positioned vertically so that plates 53 and 54 fit into couplings 41 and 42 when a scrap box fitted with those plates is raised above ground into its traveling position.

The operation of the second embodiment of my apparatus above described is essentially the same as the operation of the first embodiment of my invention. The carrier vehicle is maneuvered toward a scrap box with hooks 31 and 32 lowered and opening toward the scrap box trunnions until the hooks surround the trunnions. The shafts 43 and 44 of hydraulic torque actuators 41 and 42 are rotated so that the open ends of couplings 45 and 46 face the ground. Square plates 53 and 54 are fixed to the scrap box trunnions with their sides horizontal and vertical. Hooks 31 and 32 are raised by admitting hydraulic fluid under pressure into the lower ends of hydraulic cylinders 59 and 60, thereby raising the scrap box by its trunnions and causing plates 53 and 54 to slide into couplings 45 and 46 respectively. The carrier vehicle then transports the scrap box held by the hooks and prevented from tipping by the hydraulic torque actuators to the desired location for dumping. This operation is effected by admitting hydraulic fluid to the rotary torque actuators 41 and 42 so as to rotate the shafts 43 and 44 thereof, which rotation tips the scrap box on its trunnions in hooks 31 and 32 and inverts it over the ground.

It will be apparent to those skilled in the art that bridge 12 may be constructed of sections other than I beams, and that those sections may be box sections or beam sections which are stronger at the center of the span to achieve more uniform stress in the material.

In the foregoing specification I have described presently preferred embodiments of my invention; however, it will be understood that my invention can be otherwise embodied within the scope of the following claims.

I claim:

1. In an over-the-road vehicle comprising a powered tractor unit, a powered trailing-end unit having one axle only, and an elongated load-carrying bridge supported at its front and rear ends by the tractor unit and trailing end unit respectively, the improvement comprising means for picking up and dumping a slag pot or the like provided with trunnions comprising a pair of hook means suspended from the bridge and spaced from each other longitudinally thereof, coupling means affixed to the bridge in a vertically and horizontally fixed position relative thereto and adapted to make connection with the slag pot trunnions while it is suspended above ground in the hook means, means for raising and lowering the hook means relative to the coupling means, and means for rotating the coupling means so as to tip the slag pot about its trunnions in the hook means, whereby the trunnions are elevated to a position in which said coupling means are coupled to said trunnions prior to the dumping of said slag pot.

2. Apparatus of claim 1 in which the coupling means are affixed to the bridge intermediate its sides.

3. Apparatus of claim 1 adapted for picking up and dumping a slag pot having a non-circular trunnion end and in which the coupling means are adapted and adjusted to mate slidingly with the non-circular trunnion end from above by relative movement therebetween in a transverse vertical plane when the hook means are raised relative to the coupling means from a position below them.

4. Apparatus of claim 1 including a pair of trolleys disposed for movement transversely of the bridge, and means for moving the trolleys, each hook means being carried by a trolley.

5. Apparatus of claim 4 adapted for picking up and dumping a slag pot having a non-circular trunnion end and in which the coupling means are adapted and adjusted to mate slidingly with the non-circular trunnion end from the side by relative movement therebetween in a transverse vertical plane when the hook means are moved laterally toward the coupling means in line therewith.

6. Apparatus of claim 4 in which the coupling means are affixed to the bridge at one side thereof.

7. Apparatus of claim 6 in which the hook means in their pick-up position open away from the coupling means.

* * * * *